United States Patent [19]

Van Gompel et al.

[11] Patent Number: 4,515,506
[45] Date of Patent: May 7, 1985

[54] PALLET CARGO RESTRAINING DEVICE

[75] Inventors: James Van Gompel, Fremont, Ind.;
Ronald R. Akey, Footville, Wis.

[73] Assignee: N P Marketing Corporation, Neenah, Wis.

[21] Appl. No.: 370,131

[22] Filed: Apr. 20, 1982

[51] Int. Cl.³ .................. B60P 1/64; B60P 7/10; B61D 45/00
[52] U.S. Cl. .................. 410/46; 108/51.1; 108/55.3; 188/5; 410/77; 410/94; 410/120; 410/121
[58] Field of Search .......... 108/51.1, 55.1, 55.3, 108/55.5; 188/5, 7; 280/43.12; 410/46, 56, 66, 83, 77, 94, 120, 121; 411/461

[56]     References Cited
U.S. PATENT DOCUMENTS

| | | | |
|---|---|---|---|
| 1,142,088 | 6/1915 | Greene | 108/55.1 X |
| 1,559,827 | 11/1925 | Wittman | 411/461 X |
| 1,638,612 | 8/1927 | Baus | 410/120 |
| 2,420,640 | 5/1947 | Acteson | 108/55.1 X |
| 3,290,051 | 12/1966 | O'Brien et al. | 280/43.12 |
| 3,307,658 | 3/1967 | Stevenson | 188/5 |
| 3,421,775 | 1/1969 | Dugelay | 280/43.12 |
| 3,685,460 | 8/1972 | Steele, Jr. et al. | 108/51.1 |
| 4,317,645 | 3/1982 | Van Gompel | 410/94 |

Primary Examiner—Howard Beltran
Attorney, Agent, or Firm—Stefan J. Klauber

[57]     ABSTRACT

A cargo restraining device for a palletized load including a platform for receiving a pallet with a load of cargo thereon, and a vertical frame at one end of the platform. A handle is pivotally secured to the frame and connected to a horizontally-extending member which is movable to place it in frictional contact with a floor or supporting surface. When the pallet is placed on the platform, it can be locked in place by a serrated member which engages a cross-tie of the pallet. To lock the pallet and platform to the floor, the handle is pushed downwardly while at the same time pushing the frame toward the load. Movement of the handle, which pivots about a hinge pivotally connected to the frame, moves the horizontally-extending member into contact with the supporting surface and at the same time lifts and tilts the platform, which adds an augmented downward force on the horizontally-extending member in contact with the supporting surface.

19 Claims, 7 Drawing Figures

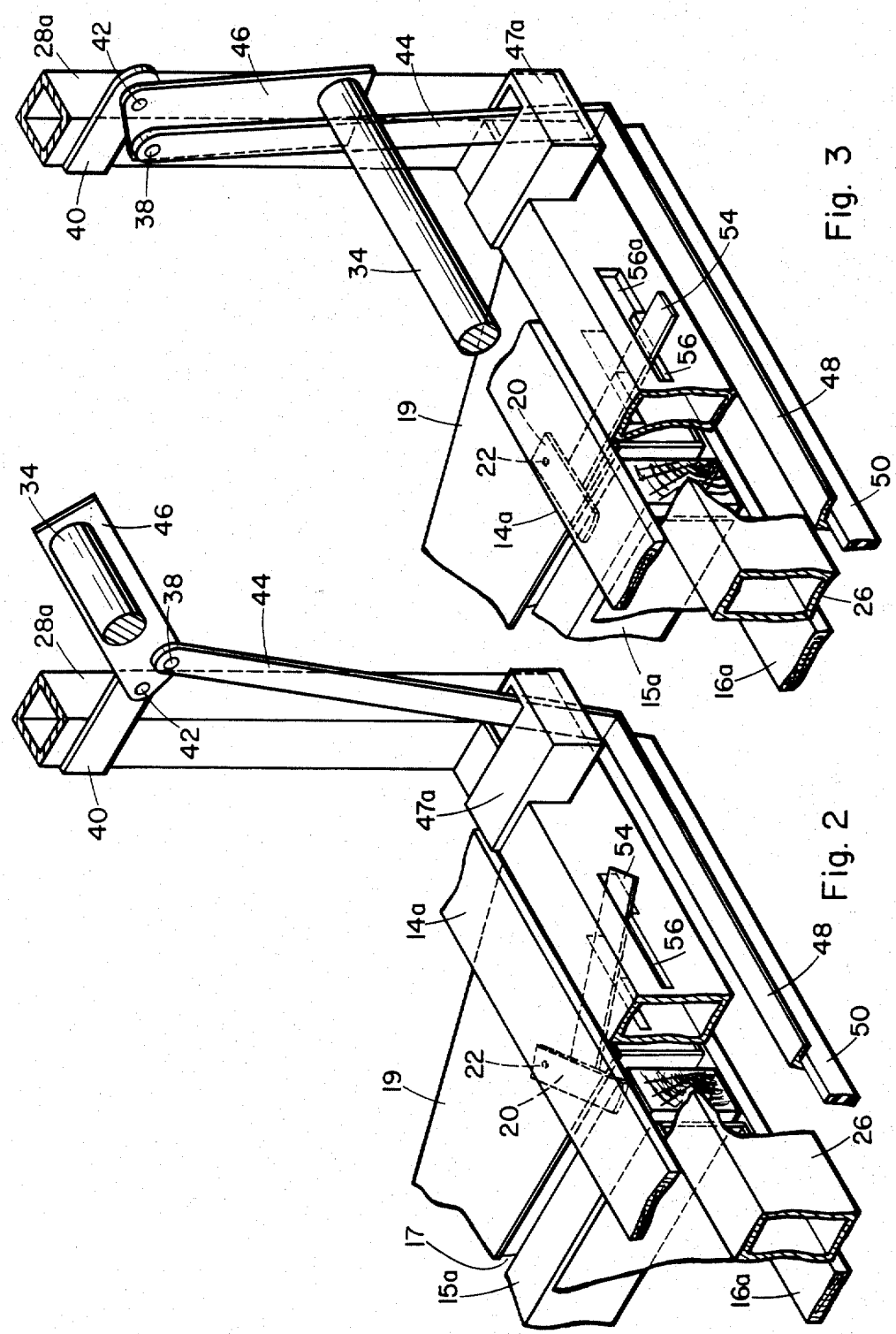

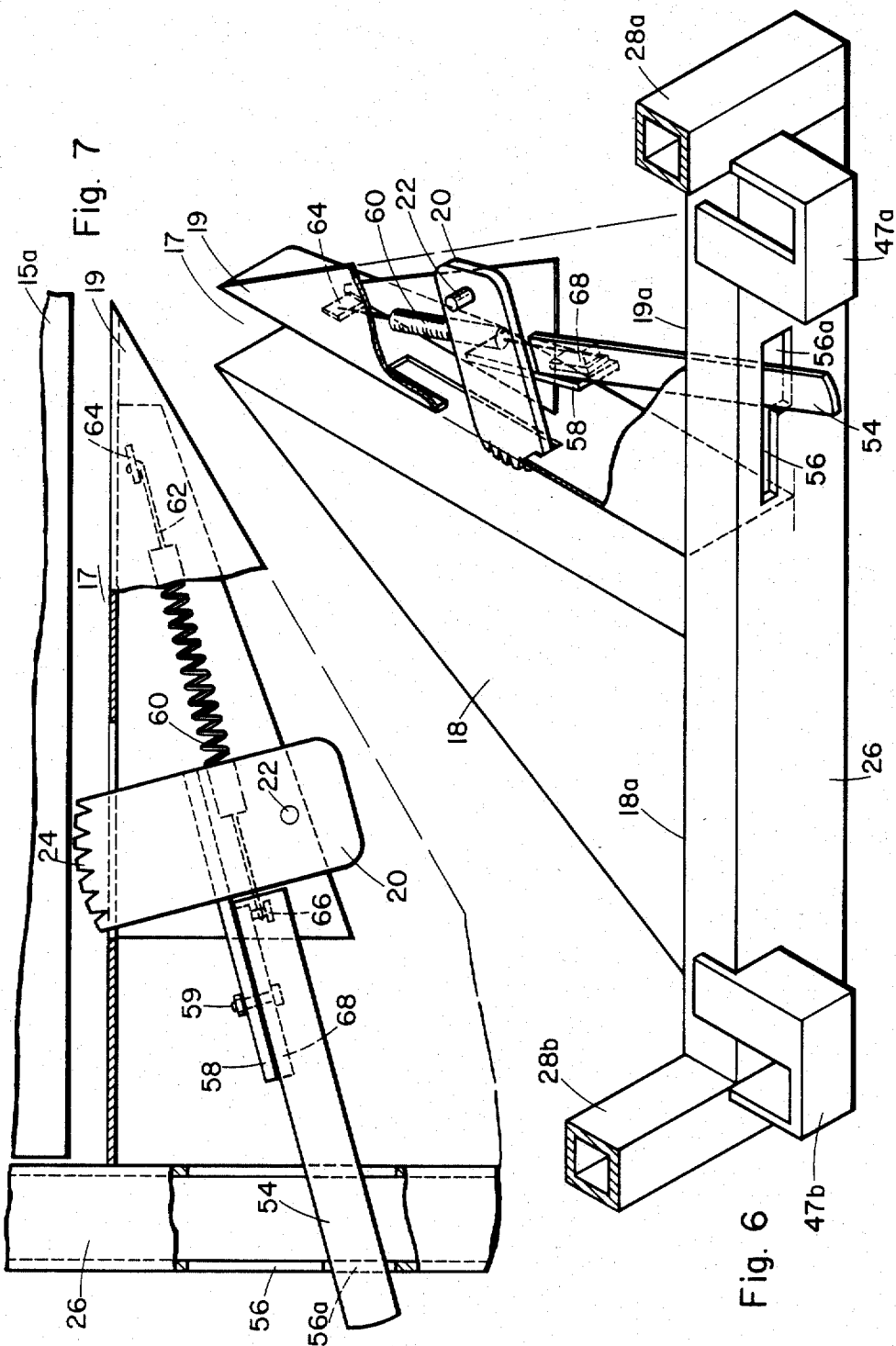

PALLET CARGO RESTRAINING DEVICE

FIELD OF THE INVENTION

This invention relates to a cargo restraining device and in particular to a device having a platform for receiving a pallet loaded with cargo and restraining the pallet against movement when placed in a carrier.

BACKGROUND OF THE INVENTION

Unless a cargo load is adequately secured within its vehicular carrier, motion of the vehicle, especially including acceleration and deacceleration of same, tends to move or shift the cargo with consequent damage to same, and often as well, damage to the carrier. Heretofore, shippers have generally found it necessary to rely on banding, blocking, or bracing to secure the cargo load and provide for its integrity. Such practices, however are not only time-consuming to install and costly, but also rely heavily on individual judgment for their adequacy.

U.S. Pat. No. 4,147,112, issued to Greene et al., relates to a cargo support or retainer which endeavors to avoid banding, blocking, or bracing of palletized cargo loads, by providing a substantially L-shaped frame, wherein the lower horizontal member which contacts the floor is provided with a plurality of "anti-skid" spikes. This device while reasonably effective, has yet been found inadequate for maintaining load integrity under a number of conditions, including when used in truck trailers mounted for piggy-back service on railroad cars. Moreover, the spikes cannot be used on the metal floors which are found in refrigerated trucks and railroad cars; and further, it is found that the mere substitution of rubber pads for the spikes does not solve this problem.

A further cargo restraining device is disclosed in U.S. Pat. No. 4,317,645 (Ser. No. 168,670, filed July 11, 1980) issued to the co-inventor herein, James Van Gompel. In this device, an elongated floor contacting member is provided with an upwardly facing load-bearing surface, the member being adapted to project forwardly beneath a portion of the cargo load. A generally upright member is secured to the floor contacting member in spaced relation from the forward end of the floor contacting member for engaging with the cargo load, and a floor piercing element is movably mounted on the floor contacting member adjacent to the rearward end thereof. The floor piercing element is normally disposed to pierce the floor when the floor contacting member of the restraining device is under load in service, and is movable to a position incapable of piercing the floor when the restraining device is out of service. This device is generally not of value with the aforementioned metal floored cars and truck vehicles, as the floor piercing elements either cannot engage the metal surfaces or simply damage same. Moreover, the device is relatively difficult to use; neither does such device positively fix a palletized load with respect to the device itself.

U.S. Pat. No. 1,559,827 issued to Wittman relates to a freight anti-creeping device including a platform having spikes in its underside for gripping the floor, and a projecting lug on its upper face to which the cargo is wired. This projecting lug requires an opening in the cargo, or else the cargo must be mounted around the lug.

U.S. Pat. No. 1,638,612 to Baus, relates to a device for shipping boxes, which includes anti-skid plates between the boxes and the floor and clamp bars over the boxes, which are drawn to the floor by rods anchored adajacent the floor, blocks being secured to the boxes for preventing movement between the clamp bars and the boxes.

U.S. Pat. No. 2,420,640 to Acteson relates to a demountable pallet crib having frame members which enclose the perimeter of the pallet and form an openwork frame to enclose the cargo.

Since modern cargo is generally palletized, i.e. placed on a pallet or plate which is conveniently carried by a fork-lift truck and placed on a carrier, it is desirable to reduce the labor required to place the pallet on the floor of the carrier and fix it in position. Thus, banding, blocking, or bracing should be eliminated. Yet, the pallet with its cargo should be restrained from movement while being transported in the carrier —and such a result must also be achieved on the metal floor commonly provided in a refrigerated truck or railway car.

In accordance with the foregoing, it may be regarded as an object of the present invention, to provide a device useful in securing a palletized load within a vehicular carrier against movement such as creeping, shifting, and the like.

It is another object of the invention to simplify the securing of a palletized load in a carrier.

It is still a further object of the invention, to provide a device for securing a palletized load in a carrier, which is simple to use both when fixing a palletized load in position, and when releasing the palletized load when it reaches its destination.

It is yet another object of the invention, to provide a device for securing and releasing a palletized load in a carrier, which requires very little effort to operate.

Still another object of the invention is to provide a device for securing and releasing a palletized load in a carrier, which is simple to construct and easy to operate.

A yet further object of the invention is to provide a device for securing and releasing a palletized load in a carrier of the type intended to refrigerate a load, which carrier is provided with a metal floor with ribs or spaced longitudinally-extending channels which allow cold air to circulate around the cargo.

SUMMARY OF THE INVENTION

Now in accordance with the present invention, the foregoing objects and others, as will become apparent in the course of the ensuing specification, are achieved by providing a cargo restraining device for a palletized cargo load, which includes a horizontal platform for receiving the pallet with the cargo load thereon, and a vertical frame at one end of the platform, against which the cargo can abut. A handle is pivotally secured by a double pivot to the frame and to a vertically-extending assembly, the lower end of which is adapted to frictionally engage the floor of the carrier. Displacement of the handle means by an operator functions to move the said lower end of the vertically-extending assembly into contact with the floor, while at the same time exerting an upward jacking force on the adjacent end of the cargo supporting platform. This slight tilting or jacking of the platform increases the downward force on the vertically-extending member, aiding it to grip the floor.

When the pallet is placed on the platform, it is immediately locked in place by a serrated member which engages a cross-tie or runner of the pallet. The pallet can only be released by disengaging the teeth of the serrated member. This is accomplished by a lever resiliently coupled to the serrated member.

To lock the pallet to the floor after it is placed on the platform, the handle is pushed downwardly, which pushes the vertically-extending assembly away from the vertical frame and horizontal platform, and toward the floor—i.e. the lower end of the assembly moves below the plane of the pallet. This in turn tends to lift one edge of the pallet in jack-like fashion, adding the weight of the cargo to the downward force on the vertically-extending assembly. Continued movement of the handle locks the vertically-extending member in its extended position restraining the pallet against movement. Since the pallet is also secured to the platform, the cargo is securely held in place.

The invention will be described in connection with the accompanying drawings, showing a preferred embodiment. However, it is apparent that modifications therein may be made without departing from the invention, which is defined in the appended claims.

DESCRIPTION OF THE DRAWING

In the drawings:

FIG. 2 is a partial perspective view of the cargo restraining device released from the pallet;

FIG. 3 is a partial perspective view of the cargo restraining device secured to the pallet and to the floor of the carrier;

FIG. 6 is a perspective view, partly in section, showing the pallet engaging mechanism; and FIG. 7 is a plan view, partly in section, of the pallet-engaging mechanism.

DESCRIPTION OF THE PREFERRED EMBODIMENT

Figure 1:
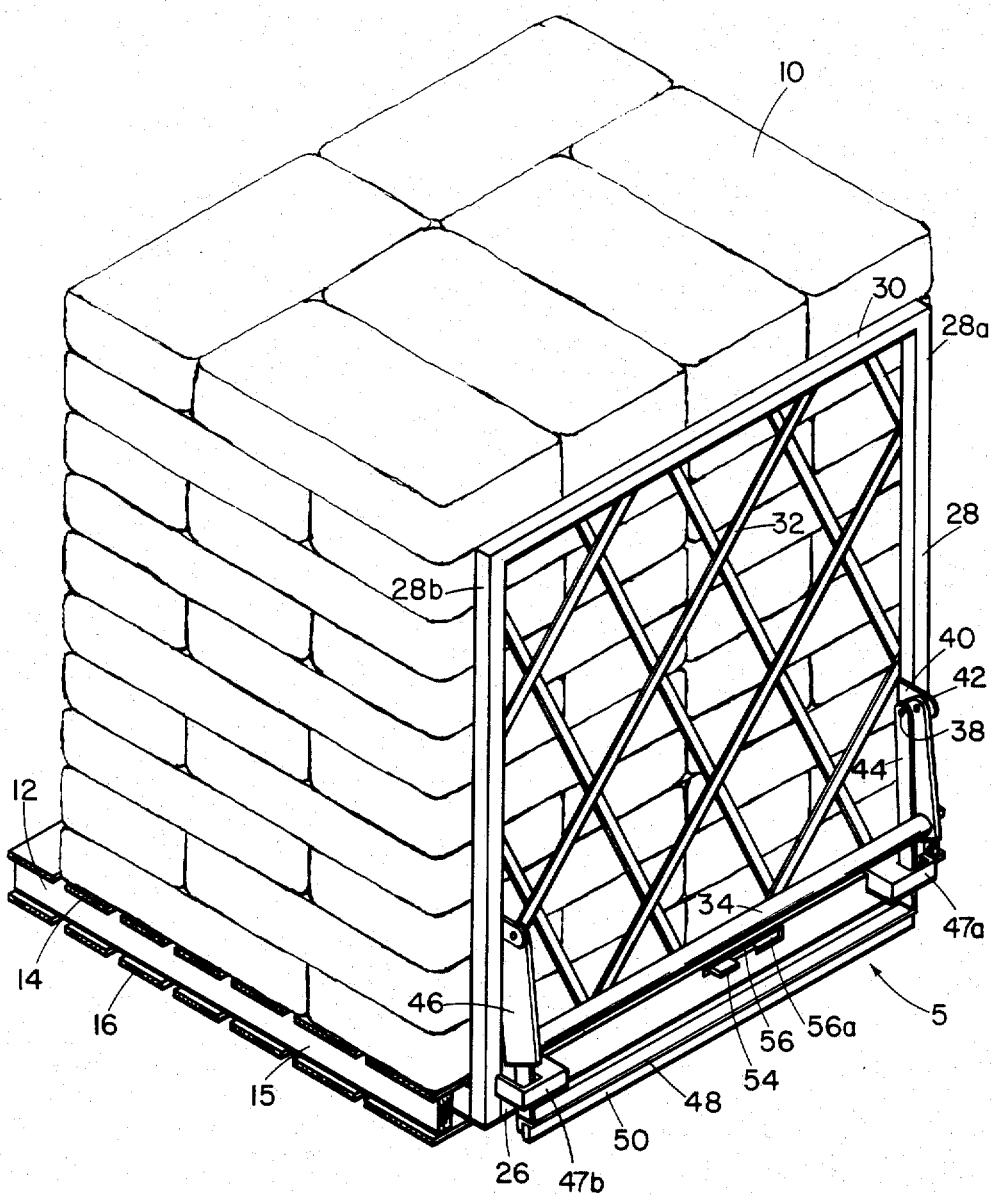
FIG. 1 is a perspective view showing a palletized cargo load support by a cargo restraining device according to the invention.

Referring to FIG. 1, a palletized load 10 is shown, supported on a conventional pallet 12, the load and pallet being associated with a cargo-restraining device 5 in accordance with the present invention.

For purposes of the present discussion, load 10 can be regarded as being of a type requiring refrigeration in shipment. Usually, therefore, such loads are shipped in refrigerator truck bodies or refrigerated railway cars. The floors of these carriers commonly comprise steel or the like, and channels or troughs often extend lengthwise in the carrier floors to enable refrigerated air to be circulated for load cooling.

Pallet 12 generally comprises an upper supporting surface 14 comprising a plurality of wooden planks, and a lower surface 16 comprised of similar planks, with the upper and lower surfaces being separated by cross-ties 15, one of which 15a (FIGS. 2 and 3), is at approximately the center of the pallet.

Figure 4:
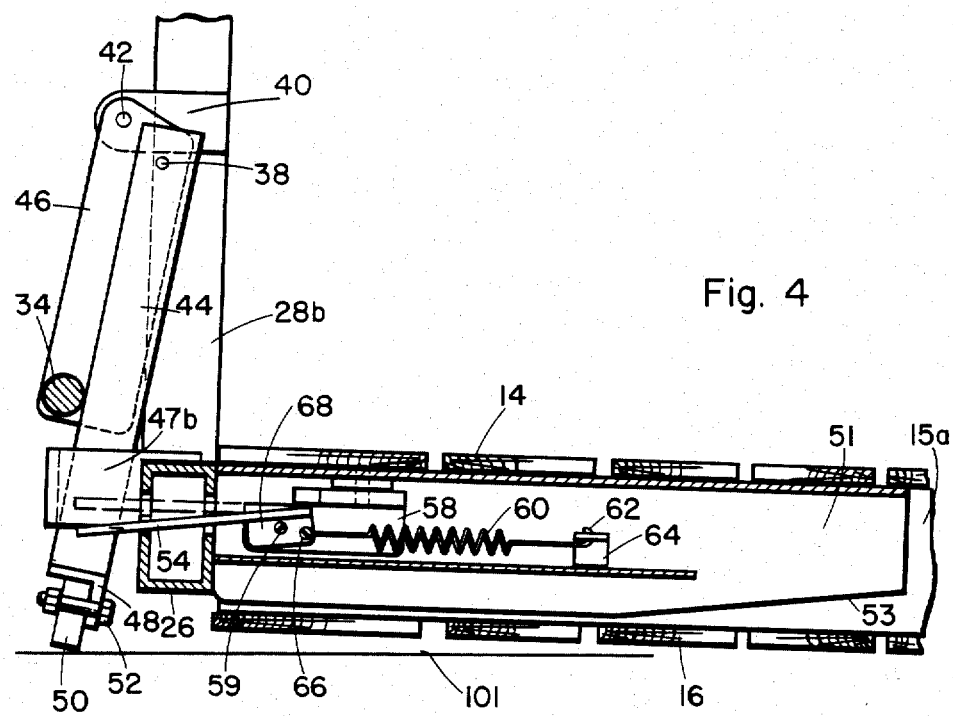
FIG. 4 is a side elevational view, in section, of the cargo restraining device clamped on the floor of the carrier.
Figure 5:
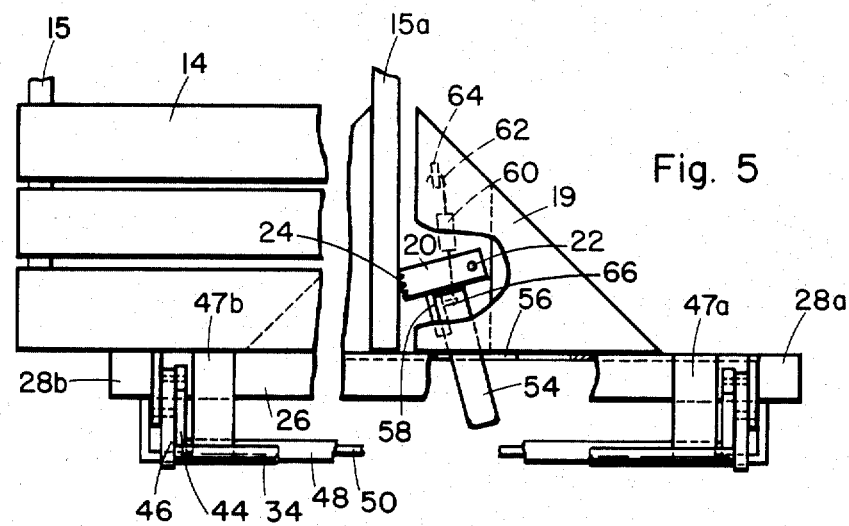
FIG. 5 is a plan view, partly in section, showing the pallet engaging mechanism.

Pursuant to the invention, cross-tie 15a slides into a slot 17 between two generally triangular-shaped plates 18, 19, (FIGS. 5 and 6), which comprise the horizontal portion of the generally L-shaped device 5, and which thus form a platform for the loaded pallet. As seen in FIG. 4, the side walls 51 of plates 18 and 19 which abound slot 17 are bevelled at 53 toward their rear—to facilitate insertions of the platform into the space between the top 14 and bottom 16 of the pallet. Cross-tie 15a is held or locked in its received position by a serrated member 20, which pivots about a pin 22, and has teeth 24 which pierce the wooden cross-tie 15a.

The base ends 18a and 19a of each triangular-shaped plate are secured to a lower horizontal beam 26 of a generally rectangular vertical frame 28 (FIG. 1), having upright legs 28a and 28b, and an upper cross-beam 30. The upper and lower cross-beams and upright legs of the vertical frame 28 are braced by diagonally extending members 32.

A handle 34 is pivotally secured at each end to a hinge 46 by a pin 38 which is pivotally secured to a plate 40 connected to the vertical legs 28a and 28b of the frame by a pin 42, in effect forming a double pivot for the handle 34. Handle 34 is thus connected at each end, through hinge 46 and pins 38 and 42 to a generally vertically-extending assembly which includes members 44. The lower ends of members 44 are surrounded by bumper guards 47a and 47b, and are connected to a cross-bar 48 carrying on its underside a horizontally extending member 50 secured to the cross-bar by a bolt 52. With the handle 34 in the upper position (FIG. 2), cross-bar 48, and in particular member 50, is above the plane of the bottom of the pallet, and is thus above the carrier floor, or supporting surface. Upon handle 34 being moved to the lowered position (FIGS. 1 and 3) however, member 50 first contacts the underlying floor and thus is extended below the pallet and to a position laterally displaced to one side of the frame 28, to prevent movement of the device 5 with the load thereon. Preferably, horizontally extending member 50 comprises, or is covered with a highly frictional material such as rubber, in order to obtain a greater frictional force from its contact with the vehicular carrier floor 101.

With a cargo load on the pallet, and the pallet positioned on the triangular-shaped plates 18, 19, movement of handle 34 thus results in movement of the vertically extending members 44 inwardly toward the frame 28, and the horizontally extending member 50 into contact with the vehicular carrier floor 101. Also because of the double pivot, when horizontal member 50 reaches the vehicular carrier floor 101, the frame 28 is moved rearwardly with respect of member 50. The triangular-shaped members 18 and 19 which support the pallet 12 are raised vertically with respect to member 50, tilting rearwardly the pallet and load. (FIG. 4). This results in an additional downward force from the cargo, upon horizontal member 50. Further, the double-pivoting action of handle 34 results in locking of same (and of member 50) in the downward position, whereby the restraining device 5 effectively locks the pallet and load to the floor of the carrier until the handle 34 is later raised to the position of FIG. 2.

In order to release the pallet after the handle 34 is raised, the serrated member 20 must be disengaged from cross-tie 15a. This is accomplished by moving lever 54 to the right in slot 56, the right end 56a of which is larger, or deeper to allow the lever to drop down. Lever 54 is connected to an arm 58 by a bolt or pin 59. Arm 58 is secured to serrated member 20. Thus, moving lever 54 to the right causes serrated member 20 to pivot counter-clockwise about 22, causing teeth 24 to disengage cross-tie 15a, permitting the pallet to be withdrawn.

In order that cross-tie 15a of the pallet may be engaged when the pallet is placed on triangular-shaped plates 18 and 19, the lever should, of course, be lifted and moved to the left in slot 56. When the lever is lifted, a spring 60 secured at one end by a hook 62 in an apertured plate 64, and at the other end to a pin 66 in a vertical bracket 68 to which arm 58 is secured by bolt or pin 59, causes serrated member 20 to rotate clockwise about pin 22 so that it is ready to engage the cross-tie 15a.

Operation of Device

When a palletized cargo load 10 is brought into a carrier by a fork-lift truck it is placed on the cargo restraining device so that a cross-tie 15a is placed the triangular-shaped plates 18 and 19 so that it rests in slot 17. If lever 54 has been returned to its original position (to the left in slot 56) as it should have been after a previous pallet was removed, teeth 24 of serrated member 20 will pierce the wooden cross-tie and firmly hold it in place.

Thereafter, handle 34 is grasped and displaced downwardly while pushing against frame 28, which will result in horizontal member 50 contacting the vehicular carrier floor 101 and then slightly tilting the load as previously discussed, to restrain movement of the device 5. Frictional contact of the horizontal member 50 is increased by the weight of the load on the pallet which has tilted rearwardly, placing further force on the horizontal member 50.

Thus, the palletized cargo is firmly secured and prevented from moving while it is being transported. Upon reaching its destination, to release the pallet with its cargo load, the handle 34 is returned to its upper position which lifts the horizontal member off the vehicular carrier floor 101. The lever 54 is moved to the right, e.g., by moving it with a foot, and this causes serrated member 20 to move counter-clockwise releasing teeth 24 from the cross-tie 15a. The pallet can now be removed from the restraining device.

While the present invention has been especially illustrated in terms of specific embodiments thereof, it will be understood in view of the instant disclosure that numerous variations upon the invention are now enabled to those skilled in the art, which variations yet reside within the scope of the present teaching. Thus, for example, while the particular linkage arrangement utilized with handle 34, results in downward displacement of member 50 when the handle is moved downwardly, linkage arrangements are possible which could achieve this same result with upward movement of the said handle. Accordingly, the invention is to be broadly construed and limited only by the scope and spirit of the claims now appended hereto.

We claim:

1. A cargo restraining device for restraining a palletized cargo load on the underlying support floor of a vehicular carrier; said device comprising:
   (a) a platform for receiving a pallet with a cargo load thereupon, said pallet being of the type including an upper load supporting surface and a lower surface separated from the upper surface by cross-ties, said platform being adapted for receipt between said upper and lower surfaces;
   (b) a substantially vertical frame extending upwardly from one end of said platform;
   (c) a horizontally-extending frictional member being pivotally connected to said frame and movable at the side of said frame which faces away from said platform, between a withdrawn position whereat the bottom of said member resides above the bottom of said pallet, and an extended position whereat the bottom of said frictional member extends beneath the bottom of said pallet and is displaced laterally away from said vertical frame and platform, the engagement of said member with said underlying support floor thereby effecting vertical tipping of said device away from the zone of engagement of said member with said floor, to thereby generate an increased contact force between the underlying support floor and the said horizontal frictional member, thereby restraining lateral relative movement between said pallet-carrying device snd said floor;
   (d) handle means movable between first and second positions, for moving said horizontally-extending frictional member between said withdrawn and extended positions, said handle means being connected to said frame and said horizontally-extending member by a double pivot, which locks said member in its extended position when said handle means is at said second position; and
   (e) means for releasably engaging said pallet, when said pallet is placed on said platform, thereby preventing movement of said pallet with respect to said platfrom and restraining device.

2. A device in accordance with claim 1, wherein said horizontally-extending member comprises a high-friction material at at least the lower surface thereof which contacts the underlying support floor.

3. A cargo restraining device as claimed in claim 1, in which the means releasably engaging the pallet on the platform is a serrated member which engages the pallet.

4. A cargo restraining device as claimed in claim 3, in which the means releasably engaging the pallet on the platform includes a lever resiliently coupled to said serrated member.

5. A cargo restraining device as claimed in claim 4, in which the means releasably engaging the pallet is a serrated member having teeth which engage a pallet cross-tie preventing movement of the cross-tie.

6. A cargo restraining device as claimed in claim 3, in which the platform comprises two portions separated by a slot for receiving a cross-tie of the pallet.

7. A cargo restraining device as claimed in claim 6, in which the serrated member has teeth which engage the pallet cross-tie preventing movement of the cross-tie.

8. A cargo restraining device as claimed claims 5 or 6, in which the serrated member is pivotally connected to one of the platform portions.

9. A cargo restraining device comprising:
   (a) a platform for receiving a pallet with a cargo load thereon, said pallet being of the type including an upper support surface, a lower surface, and intervening cross-ties, said platform being adapted for receipt between said upper and lower surfaces; said platform having two portions separated by a slot therebetween for receiving a said cross-tie of the pallet;
   (b) a vertical frame extending upwardly from the platform;
   (c) a handle and hinge means pivotally securing the handle to the said frame at a first pivot and to vertically-extending members at a second pivot, said vertically-extending members being connected to a horizontal member adapted to contact an underlying supporting surface when said handle is moved downwardly; said second pivot being displaced past its vertically aligned lowermost point of rotation with respect to said first pivot and toward said vertical frame when said handle is moved downwardly, said vertically-extending members being thereby angled with their lower ends further away from said vertical frame and platform than their upper ends, thereby locking said handle in said downward position; and (d) means to releasably secure said pallet when said pallet is placed on said platform, preventing movement of said pallet on said platform.

10. A cargo restraining device as claimed in claim 9 in which the means to releasably engage the pallet is a serrated member which engages the cross-tie.

11. A cargo restraining device as claimed in claim 9 in which the means to pivotally secure the handle to the frame is a hinge.

12. A cargo restraining device as claimed in claim 11, in which the hinge is pivotally secured to the vertically-extending members which connect to the horizontal member.

13. A cargo restraining device as claimed in claims 9, 11, or 12, in which at least the lower face of said horizontal member comprises a frictional material which is placed in contact with the said underlying supporting surface.

14. A cargo restraining device as claimed in claims 9, 11, or 12 which the means to releasably engage the pellet is a serrated member pivotally secured to one of said platform portions and has teeth which engage the pallet cross-tie member and includes means to release the teeth from the cross-tie to permit removal of the pallet.

15. A cargo restraining device as claimed in claim 9, 11, or 12 in which the pallet securing means includes a serrated member having teeth for engaging the pallet cross-tie member, said serrated member being pivotally secured to one of said platform portions, a moveable lever connected to said serrated member, and resilient means securing said lever to said platform portion to which said serrated member is secured whereby movement of said lever causes said serrated member to rotate releasing the teeth of said serrated member from said cross-tie.

16. A cargo restraining device for restraining a palletized cargo load mounted within a vehicular carrier; said device comprising:

a horizontal platform for receiving a pallet with a cargo load thereupon, said pallet being of the type including an upper load supporting surface and a lower surface separated from the upper surface by cross-ties, said platform being adapted for receipt between said upper and lower surfaces;

a vertical frame at one end of said platform, against which the palletized load can abut;

a vertically-extending assembly, the lower end of which is adapted to frictionally engage the floor of said carrier at an area laterally displaced from said vertical frame at the side thereof exterior of said platform; and handle means pivotally secured to said frame and to said assembly by a hinge pivotally connected to said frame at a first pivot and to said vertically-extending assembly at a second pivot, to thereby define a double pivot, said handle means and hinge being movable to a position whereat the said lower end of said assembly is brought into contact with the underlying floor of said carrier and then extended below said pallet to exert an upward jacking force on the adjacent end of said cargo supporting platform, to increase the contact force between said lower end of said assembly at said floor, aiding same to frictionally grip said floor, said second pivot in said position being displaced past its vertically aligned lowermost point of rotation with respect to said first pivot and toward said vertical frame, said vertically-extending assembly being thereby angled with its lower end further away from said vertical frame and platform than its upper end, thereby locking said handle in said position.

17. A device in accordance with claim 16, further including means to positively engage a part of said pallet when said pallet is received at said platfrom, thereby locking said pallet to said device.

18. A device in accordance with claim 16, wherein the lower end of said assembly comprises a horizontally-extending member at least the lower surface of which comprises a high-friction material.

19. A device in accordance with claim 18, wherein the means engaging said pallet is a serrated member which engages the pallet.

* * * * *

UNITED STATES PATENT AND TRADEMARK OFFICE
CERTIFICATE OF CORRECTION

PATENT NO. : 4,515,506
DATED : May 7, 1985
INVENTOR(S) : James Van Gompel and Ronald R. Akey It is certified that error appears in the above-identified patent and that said Letters Patent are hereby corrected as shown below:

Column 3, line 25; "support" should read -- supported --.

Column 5, line 15; after "placed" insert -- between --.

Column 6, line 16; "snd" should read -- and --.

Column 6, line 28; "platfrom" should read -- platform --.

Column 7, line 32; after "12" insert -- in --.

Column 8, line 40; "platfrom" should read -- platform --.

Signed and Sealed this

Eighth Day of October 1985

[SEAL]

Attest:

DONALD J. QUIGG

Attesting Officer

*Commissioner of Patents and Trademarks—Designate*

REEXAMINATION CERTIFICATE (2769th)

United States Patent
Van Gompel et al.

[11] B1 4,515,506
[45] Certificate Issued Jan. 9, 1996

[54] PALLET CARGO RESTRAINING DEVICE

[75] Inventors: James Van Gompel, Fremont, Ind.; Ronald R. Akey, Footville, Wis.

[73] Assignee: Palla-Gard International, Inc., Appleton, Wis.

Reexamination Request:
No. 90/003,741, Feb. 24, 1995

Reexamination Certificate for:
Patent No.: 4,515,506
Issued: May 7, 1985
Appl. No.: 370,131
Filed: Apr. 20, 1982

Certificate of Correction issued Oct. 8, 1985.

[51] Int. Cl.⁶ ............. B60P 1/64; B60P 7/10; B61D 45/00
[52] U.S. Cl. ............. 410/46; 108/51.1; 108/55.3; 188/5; 410/77; 410/94; 410/120; 410/121

[56] References Cited

U.S. PATENT DOCUMENTS

| | | | |
|---|---|---|---|
| 2,236,281 | 3/1941 | Anderson | 188/5 |
| 2,537,909 | 1/1951 | Puddester | 155/30 |
| 2,796,186 | 6/1957 | Arnot | 214/621 |
| 2,899,010 | 8/1959 | Ledgerwood | 182/118 |
| 3,164,261 | 1/1965 | Larson | 212/145 |
| 3,307,658 | 3/1973 | Stevenson | 188/5 |
| 3,726,236 | 4/1973 | Colas | 108/51.1 |

OTHER PUBLICATIONS

Artobolevsky, "Mechanisms In Modern Engineering Design", vols. I and II, Lever Mechanisms, pp. 5–17, and 562–567 (1975).

"Materials Handling Handbook", Edited by Bolz et al., 1958, pp. 41.21–23.

*Primary Examiner*—William E. Terrell

[57] ABSTRACT

A cargo restraining device for a palletized load including a platform for receiving a pallet with a load of cargo thereon, and a vertical frame at one end of the platform. A handle is pivotally secured to the frame and connected to a horizontally-extending member which is movable to place it in frictional contact with a floor or supporting surface. When the pallet is placed on the platform, it can be locked in place by a serrated member which engages a cross-tie of the pallet. To lock the pallet and platform to the floor, the handle is pushed downwardly while at the same time pushing the frame toward the load. Movement of the handle, which pivots about a hinge pivotally connected to the frame, moves the horizontally-extending member into contact with the supporting surface and at the same time lifts and tilts the platform, which adds an augmented downward force on the horizontally-extending member in contact with the supporting surface.

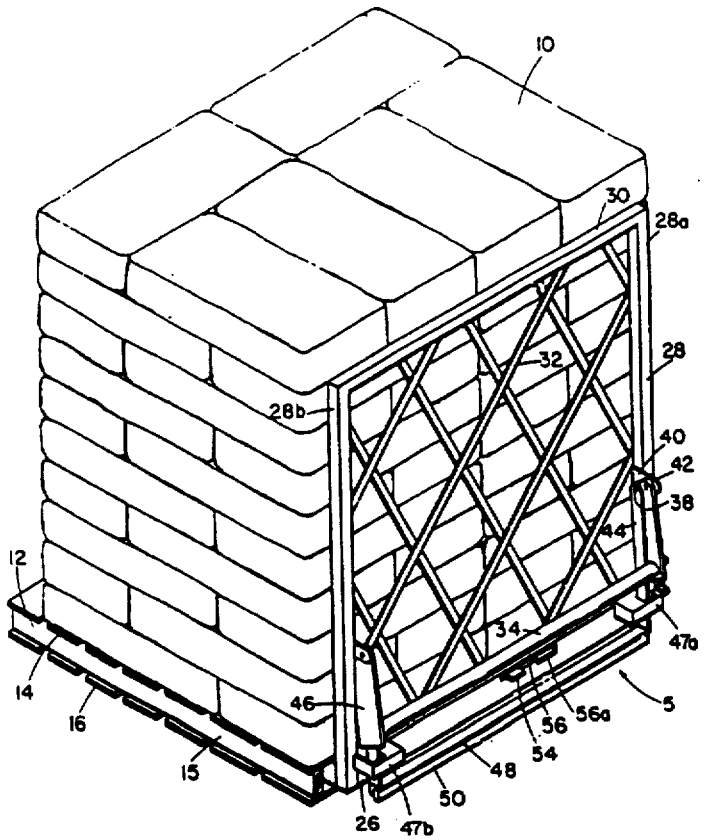

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1–15, 17 and 19 is confirmed.

Claims 16 and 18 are cancelled.

* * * * *